United States Patent

[11] 3,536,103

| [72] | Inventors | T. O. Paine<br>Acting Administrator of the National<br>Aeronautics and Space Administration with<br>respect to an invention of Lloyd E.<br>Tomlinson, Woodland Hills, California<br>91364;<br>Lloyd E. Tomlinson, Woodland Hills,<br>California 91364 |
|------|-----------|---|
| [21] | Appl. No. | 787,410 |
| [22] | Filed | Dec. 27, 1968 |
| [45] | Patented | Oct. 27, 1970 |

[54] TEMPERATURE SENSITIVE FLOW REGULATOR
11 Claims, 1 Drawing Fig.

| [52] | U.S. Cl. | 138/43 |
|------|----------|--------|
| [51] | Int. Cl. | F15d 1/02 |
| [50] | Field of Search | 138/43, 42, 114 |

[56] References Cited
UNITED STATES PATENTS

| 2,473,069 | 6/1949 | Niks | 138/42X |
|-----------|--------|------|---------|
| 2,612,747 | 10/1952 | Skinner | 138/45X |
| 3,016,921 | 1/1962 | Tadewald | 138/42X |

Primary Examiner—Edgar W. Geoghegan
Attorneys—L. D. Wofford, Jr., W. H. Riggins and G. T. McCoy ABSTRACT: A device for changing the flow rate of a fluid in a duct in response to a change in temperature. The device permits a uniform flow through a fixed orifice in the duct and a variable flow through holes in the walls of two nested metallic sleeves of truncated cone structure. The device is constructed of metallic materials having different thermal expansions arranged to cause the sleeves to slide and change diameter relative to each other in response to temperature changes. The relative movement of the sleeves varies the amount of flow space area through the walls of the sleeves.

Patented Oct. 27, 1970  3,536,103
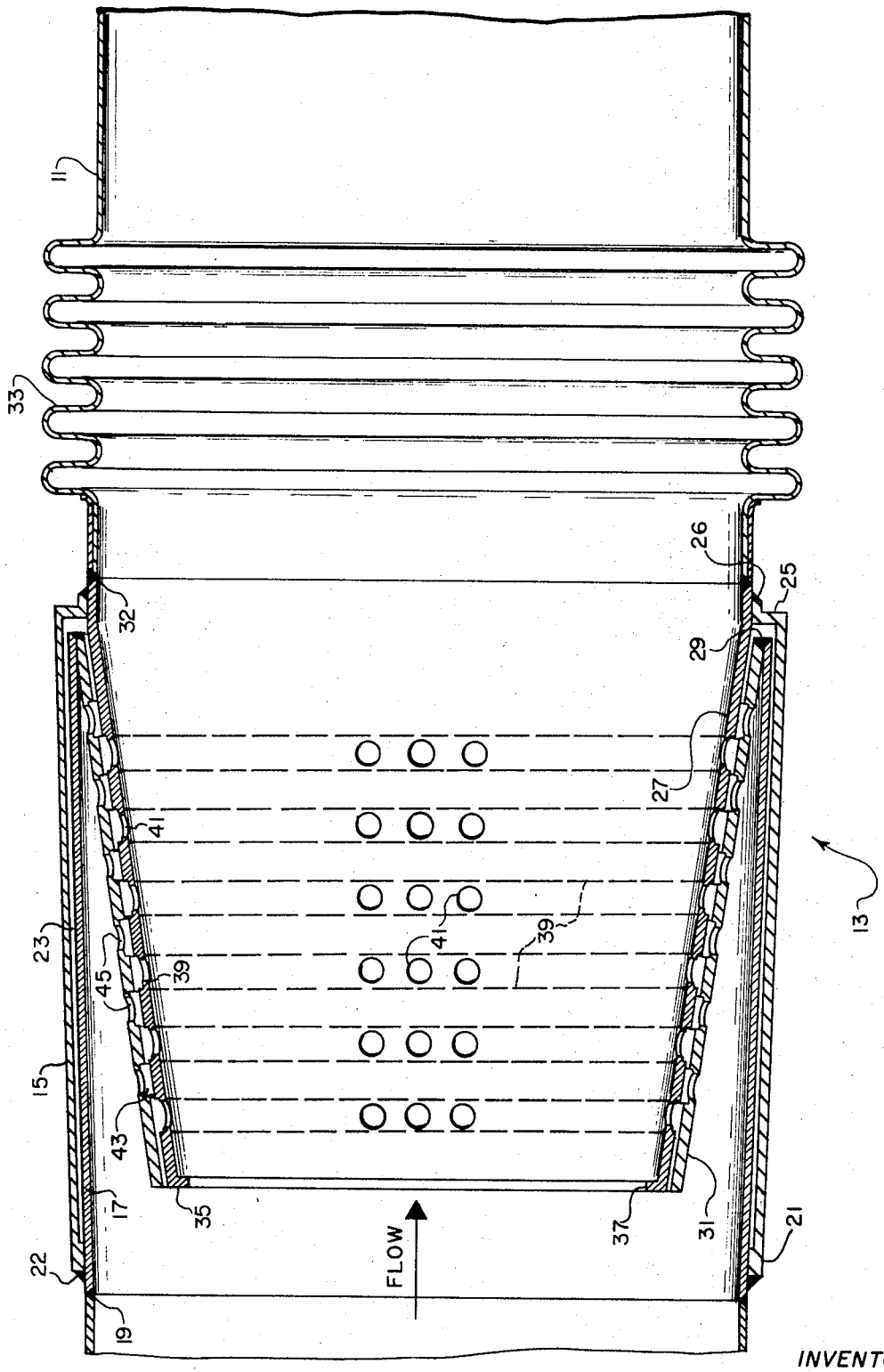
INVENTOR
LLOYD E. TOMLINSON
BY
Wayland H. Riggins
ATTORNEYS

TEMPERATURE SENSITIVE FLOW REGULATOR

ORIGIN OF INVENTION

The invention described herein was made in the performance of work under a NASA contract and is subject to the provisions of Section 305 of the National Aeronautics and Space Act of 1958, Public Law 35–568 (72 Stat. 435; 42 U.S.C. 2457).

BACKGROUND OF THE INVENTION

This invention relates generally to flow control devices and more particularly to a device for changing the flow rate of a fluid through a duct in response to changes in temperature.

Temperature responsive valves and flow regulating devices are known in the prior art and are used in various facilities associated with industries such as the petroleum, gas and refrigeration industries. However, prior devices of this nature are rather elaborate and complex in that they require special temperature sensing elements and special actuators to effect the increase or decrease in flow space. Thus, there is a general need for a simplified, self contained temperature responsive flow regulating device; that is, one that does not require the incorporation of special sensing elements and power sources. A particular application for a self contained, temperature responsive flow regulator is in the field of rocket engines wherein certain instances it is desirable to vary the flow rate of gases in an engine ducting system in response to variations in the temperature of the gases.

SUMMARY OF THE INVENTION

The invention comprises a pair of conical sleeves that project into a flow duct, tapering inwardly from the wall of the duct in the upstream direction. The sidewalls of the tapered sleeves are provided with groups of holes, and grooves extend between and communicate with pairs of these holes. The grooves and holes in one sleeve are offset but in near overlapping relationship with respective grooves and holes in the adjacent sleeve. The sleeves and associated elements are made of metallic materials having different thermal expansion properties, and the materials are selected and arranged so that a change in temperature causes the sleeves to slide and change diameter relative to each other. This relative movement of the sleeves due to a change in temperature causes the grooves in the walls of the sleeves to move between a position of minimum overlap and a position of maximum overlap with each other and also causes a change in the amount of space between the adjacent walls of the two sleeves. Overlapping of the holes will also occur if the movement of the sleeves is sufficiently large. Thus, the fluid flow through the walls of the sleeves changes as the temperature changes.

Accordingly, it is an object of the present invention to provide an improved temperature responsive flow control device that is self contained and free of external sensing elements or power sources.

Another object of the invention is to provide a flow control device for installation in a duct that permits a fixed minimum flow plus an additional flow that changes in response to changes in temperature.

These and other objects and advantages of the invention will beocme apparent upon reference to the following specification, attendant claims and drawing.

BRIEF DESCRIPTION OF THE DRAWING

The drawing shows a cross-sectional view through a duct having the temperature sensitive flow regulator of the present invention installed therein.

DESCRIPTION OF THE PREFERRED EMBODIMENT

Referring to the drawing, a fluid conducting duct 11 has a temperature sensitive flow regulator 13 installed therein. The purpose of the flow regulator 13 is to change the flow rate of fluid through the duct in response to a change in temperature of the duct produced, for example, by a change in the temperature of the fluid flowing through the duct. The flow through the duct is from left to right as indicated in the drawing.

The flow regulator 13 comprises an outer tubular segment 15 and an inner tubular segment 17 such that these two segments form a continuation of the duct wall in the vicinity of the flow regulator. The upstream end of the inner tubular segment 17 is at 19 welded end-to-end with the wall of the duct 11, and the upstream end of the outer tubular segment 15 has a thickened portion 21 that is welded at 22 to the inner tubular segment 17. The thickened portion 21 produces a slight space 23 between the tubular segments 15 and 17.

The downstream end of the outer tubular segment 15 has an annular flange 25 that is directed inwardly and welded at 26 to the end portion of a first sleeve 27. The downstream end of the inner tubular segment 17 is welded at 29 to a second sleeve 31.

The sleeves 27 and 31 are of a truncated cone shape tapering in the upstream direction.

The sleeves are nested together with the sleeve 27 being fitted within the sleeve 31. The downstream end of the sleeve 27 is at 32 welded end-to-end with the duct 11. Near the downstream end of the sleeve 27 the duct wall has a corrugated or bellows-like section 33 formed in the duct wall for the purpose of compensating for expansion and contraction produced by the flow control regulator 13 as will be described hereinafter. The sleeves 27 and 31 are open at both ends with the smaller end of the inner sleeve 27 being turned in slightly at 35 to define an orifice 37.

The wall of the inner sleeve 27 has a series of longitudinally spaced annular grooves 39 in the outer surface thereof. Spaced circumferentially around the wall of the sleeve 27 are groups of holes 41 that coincide with the grooves 39 in longitudinal spacing, forming rows of holes longitudinally of the sleeve. The diameter of the holes 41 is somewhat less than the width of the grooves 39. In the embodiment illustrated the groups of holes 41 comprise three holes located at each groove and with the groups being spaced 90° circumferentially on center.

The outer sleeve 31 has longitudinally spaced grooves 43 formed in the inner wall surface and has holes 45 in the wall arranged in the same manner as the holes in the inner sleeve 27. The centers of the holes and grooves in the sleeve 27 are offset, respectively, with the centers of the holes and grooves in the sleeve 31 while peripheral areas of the holes and grooves are in near-overlapping relationship. The offset of the holes 41 and 45 is in the direction transversly of the sleeves 27 and 31. The holes in each of the sleeves are aligned in the direction longitudinally of the sleeves.

As may be understood from the description thus far, when fluid is flowing in the duct 11 from left to right a uniform flow rate is permitted through the fixed orifice 37 in the end of the inner sleeve 27. It is also apparent that additional flow would be permitted through the walls of the sleeves 27 and 31 if these sleeves were shifted relative to each other longitudinally to produce a degree of overlapping of the grooves 39 and 43. Flow through the sleeves 27 and 31 would also be increased if the amount of separation between the surfaces of the sleeves 27 and 31 is increased. The drawing illustrates the condition of minimum flow through the duct 11 since there is no overlapping of the grooves and there is a minimum space between the surfaces of the sleeves 27 and 31. In the disclosed embodiment the holes 41 and 45 are of less diameter than the width of the grooves 39 and 43, so that the grooves will overlap before any overlapping of the holes occurs, permitting fluid flow through the holes 45, within the grooves, and then through the holes 41. However, if the sleeves shift enough to produce overlapping of the holes 41 and 45 fluid flow will also occur directly through the overlapping area of the holes.

The variation in the amount of overlapping of the grooves 39 and 43, and the holes 41 and 45, as well as the variation in the amount of space between the surfaces of the sleeves 27 and 31, is effected by the difference in the thermal expansion of the metallic materials used to construct the respective elements of the flow control regulator. The outer tubular segment 15 is made of a corrosive resistant steel having a coefficient of thermal expansion of $10 \times 10^{-6}$ in/in °F. The inner sleeve 27 is constructed of a metallic material, such as invar, having a relatively low coefficient of thermal expansion of $1 \times 10^{-6}$ in/in °F (the material having a relatively high thermal expansion is illustrated with widely spaced cross hatching while the material having a relatively low thermal expansion is illustrated with close cross hatching). The inner tubular segment 17 is made of the same material as the inner sleeve 27, i.e. invar, and the outer sleeve 31 to which the inner tubular segment 17 is welded is made of the same material as the outer tubular segment 15, i.e. a corrosive resistance steel having a coefficient of thermal expansion ten times greater than the invar.

When the temperature in the vicinity of the flow regulator increases, the outer tubular segment 15 will increase in length substantially more than will the inner tubular segment 17 and the inner sleeve 27. This will result in the inner sleeve 27 being shifted to the right or toward the compensating bellows-like section 33, and overlapping of the grooves 39 and 43 in the respective sleeves 27 and 31 will occur. Overlapping of the holes 41 and 45 will also occur if the temperature increases is sufficiently large. An increase in temperature will also cause a greater increase in the length of the outer sleeve 31 than in the length of the inner sleeve 27 resulting in additional relative sliding in opposite directions of the sleeves 27 and 31. In addition to this relative sliding of the sleeves 27 and 31 in opposite direction to effect overlapping of the grooves and holes in the walls of the respective sleeves, the space between the surfaces of the sleeves is increased by an increase in temperature since the outer sleeve 31 expands more than the inner sleeve 27. This expansion increases the diameter of the outer sleeve 31 relative to the inner sleeve 27 and increases the space between the surfaces of the sleeves permitting more flow between these surfaces including the surfaces of the grooves 39 and 43.

I claim:

1. A temperature sensitive flow regulator for controlling the flow rate of a fluid through a duct comprising:
   a. a first flow control wall element having a portion thereof disposed in the fluid flow path of said duct;
   b. a second flow control wall element having a portion thereof disposed in the fluid flow path of said duct;
   c. said portions of said wall elements being substantially parallel, a surface of one of said portions being opposite and contiguous with a surface of the other of said elements;
   d. each of said portions having a plurality of holes therethrough;
   e. grooves being formed in said opposite surfaces of said elements and extending between and communicating with said holes;
   f. the centers of said holes and grooves in one of said elements being offset, respectively, with said holes and grooves in the other of said elements with peripheral areas of said grooves being in near-overlapping relationship;
   g. temperature responsive means for producing sliding movement between said contiguous portions of said elements to move said offset grooves between a position of minimum overlap and a position of maximum overlap thereby varying the fluid flow permitted through said elements; and
   h. said means for producing sliding movement including thermal expansion characteristics of selected parts of said flow control regulator.

2. The invention as defined in claim 1 wherein said means for producing sliding movement further includes means for effecting a minimum space between said surfaces when said grooves are in a position of minimum overlap and a maximum space between said surfaces when said grooves are in a position of maximum overlap.

3. The invention as defined in claim 2 wherein said wall elements comprise inner and outer nested conical sleeves disposed longitudinally of said duct, the diverging ends of said sleeves being joined to the wall of said duct.

4. The invention as defined in claim 3 wherein the converging ends of said conical sleeves define a truncated conical plane, said converging ends forming an opening, said holes being arranged in longitudinal rows in the walls of said sleeves, said grooves extending annularly around the walls of said sleeves.

5. The invention as defined in claim 3 wherein said duct comprises a closed tube, inner and outer tubular segments forming a portion of said tube in the vicinity of said conical sleeves, said outer segment being joined to said inner sleeve, said inner segment being joined to said outer sleeve.

6. The invention as defined in claim 5 wherein said outer segment has a coefficient of thermal expansion greater than the coefficient of thermal expansion of said inner segment.

7. The invention as defined in claim 6 wherein said outer sleeve has a greater coefficient of thermal expansion than said inner sleeve.

8. The invention as defined in claim 6 including means incorporated in said duct for compensating for expansion and contraction of said outer tubular segment.

9. The invention as defined in claim 6 wherein the coefficient of thermal expansion of said outer tubular segment is at least ten times greater than the coefficient of thermal expansion of said inner tubular segment.

10. The invention as defined in claim 6 wherein said inner and outer segments comprise the wall of said duct from the diverging end of said sleeves to a point beyond the converging ends of said sleeves.

11. A temperature sensitive flow regulator for controlling the flow rate of a fluid through a duct comprising:
    a. a first flow control wall element having a portion thereof disposed in the fluid flow path of said duct;
    b. a second flow control wall element having a portion thereof disposed in the fluid flow path of said duct;
    c. said portions of said wall elements being substantailly parallel, a surface of one of said portions being opposite and contiguous with a surface of the other said elements;
    d. each of said portions having a hole therethrough;
    e. the centers of said holes in said elements being offset transversely of said wall elements with peripheral areas of said holes being at least in near-overlapping relationship;
    f. temperature responsive means for producing sliding movement between said contiguous portions of said elements to move said offset holes between a position of minimum overlap and a position of maximum overlap thereby varying the fluid flow permitted through said elements; and
    g. said means for producing sliding movement including thermal expansion characteristics of selected parts of said flow control regulator.